June 11, 1929.　　　　C. H. LOGUE　　　　1,716,924
DEVICE FOR BURNISHING BEVEL OR HYPOID GEARS
Filed Aug. 16, 1927　　　2 Sheets-Sheet 1

WITNESS
INVENTOR
C. H. Logue
BY
ATTORNEYS

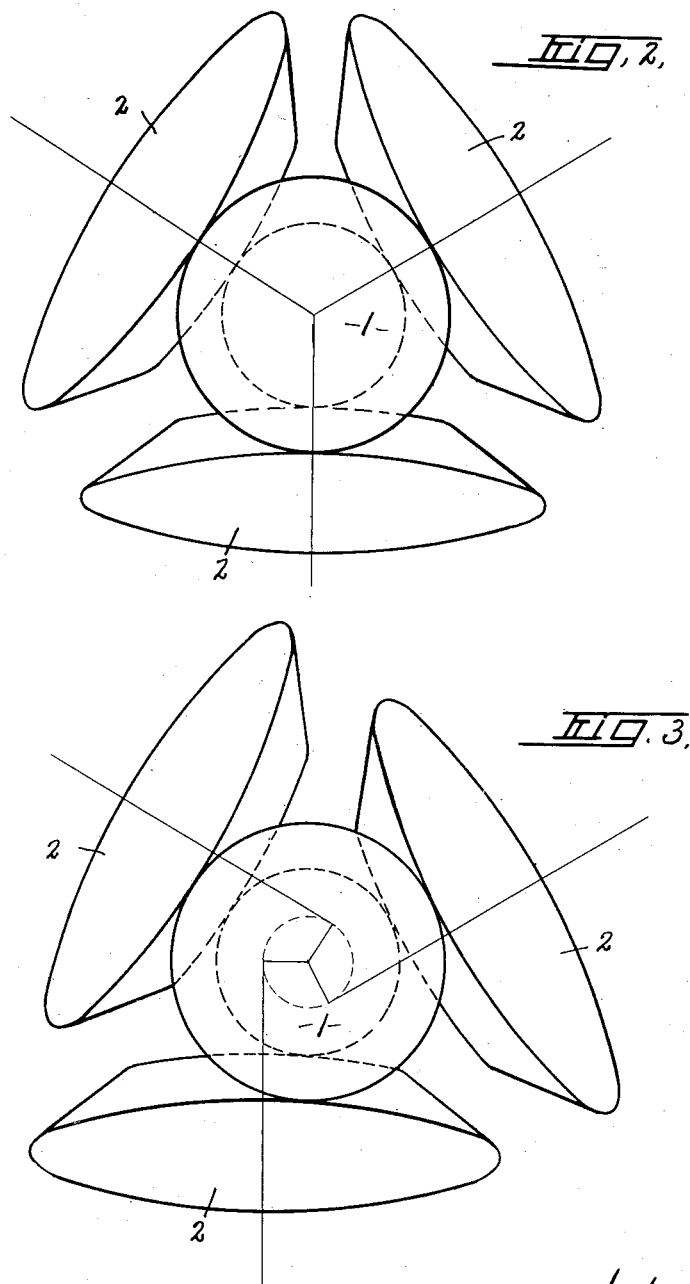

Patented June 11, 1929.

1,716,924

UNITED STATES PATENT OFFICE.

CHARLES H. LOGUE, OF SYRACUSE, NEW YORK.

DEVICE FOR BURNISHING BEVEL OR HYPOID GEARS.

Application filed August 16, 1927. Serial No. 213,311.

This invention relates to a method of and apparatus for burnishing or finishing the teeth of beveled or conical gearing, to enable them to run more smoothly and quietly, and therefore, with greater efficiency when put into practical use, as for example in the differentials and other parts of motor vehicles.

The main object is to assure a more perfect running relation between the beveled gears of this class of machines than has heretofore been practiced, by a simple method of previously rolling the gear under process with at least three other master burnishing gears arranged in uniformly spaced relation circumferentially about the axis of the gear under treatment, and in normal running position so that the uniform, angular velocity of the master gears will correct any error in the velocity of the gear under treatment.

Another object is to provide means for gradually increasing the pressure between the master gears and gear under process as they are rolled together in unison.

One of the specific objects is to support the gear under treatment in such manner that it is free to float or change position to compensate for inaccuracies in the contour of its teeth to be rectified by the contact of the burnishing teeth therewith during the relative rolling motion of the master gears with the gear under treatment.

Another specific object is to effect this relative rolling motion without applying power to any one of the gears independently of the others, but rather to effect a bodily planetary movement of the master gears about the axis of the gear in process, and thereby to produce a uniform pressure of all of the inter-meshing teeth with each other.

Other objects and advantages relating to specific steps of the process or parts of the apparatus will be brought out in the following description. In the drawings:

Figure 2 is a diagrammatic view of a bevel gear under process and three master burnishing gears in operative position for burnishing the first-named gear and arranged with their axes intersecting each other at the point or apex or angle of the gear in process.

Figure 3 is a diagrammatic view similar to Figure 2 showing hypoid master gears in rolling mesh with the bevel gear under treatment, and the axes of the master gears tangential to a circle concentric with the axis of the gear in process.

Figure 1:
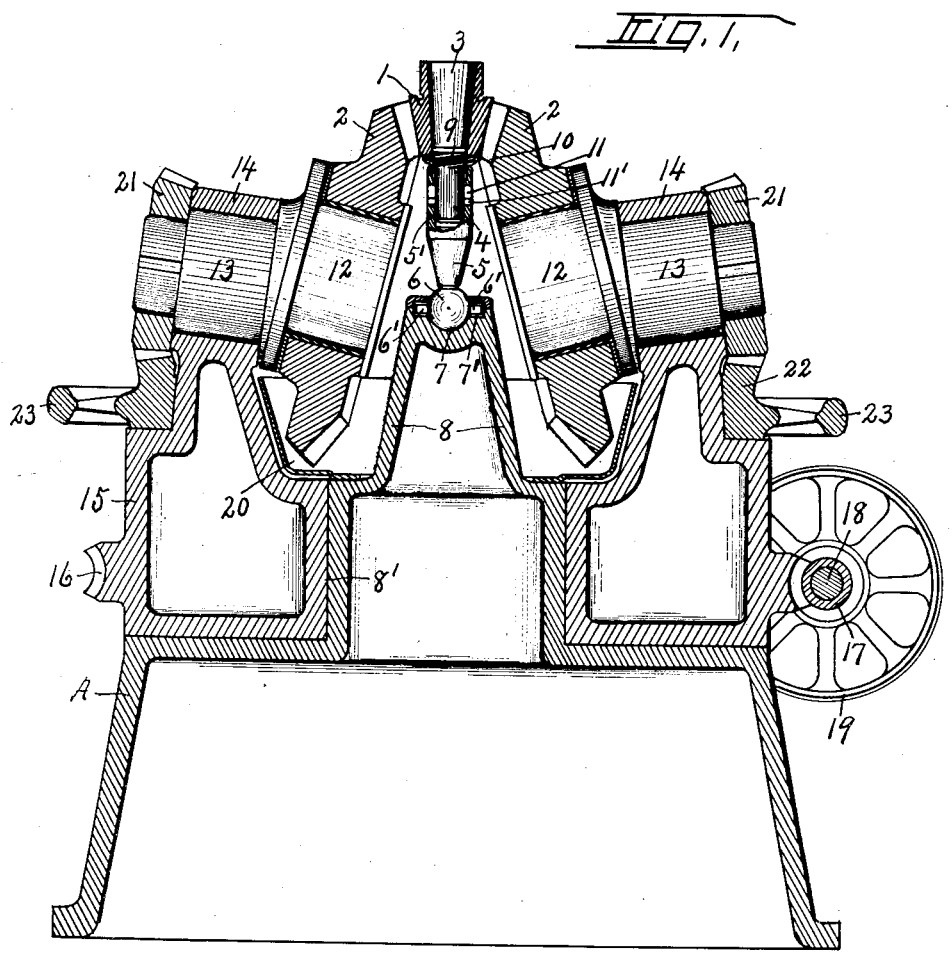
Figure 1 is a vertical sectional view of a preferred form of apparatus for carrying out the objects of the invention in which the axes of the master gears intersect with each other and also intersect the produced axis of the gear under treatment at the center or apex of the angle of the pitch-cone of the gear under treatment.

In Figure 1 I have shown a gear to be treated as consisting of a bevel pinion —1— meshing with a plurality of, in this instance three master burnishing gears —2— which are arranged in uniformly spaced relation circumferentially around the axis of the pinion —1— with the apexes of their respective pitch cones coincident with the apex of the pitch cone of the pinions, or in other words, with their axes intersecting each other in the axis of the pinion, as shown more fully in Figure 2.

The pinion —1— is mounted upon an inwardly tapered spindle —3— to move therewith, said spindle being provided with a reduced inwardly extending stem —4— which is splined in a socketed member —5— having its lower end provided with a ball —6— journaled in a spherical socket —7— in a stationary hub —8— on the main supporting-frame A, for rocking movement.

The intermediate portion of the stem —4— adjacent the inner end of the pinion —1— is threaded at —9— and engaged by a nut —10— for tightening the pinion on the tapered portion of the spindle —3—. The stem —4— on the inner end of the spindle is closely fitted in a socket, as 5' of the post —5— and is provided with a pin —11— extending into a slot —11'— in the walls of the socket to transmit rotary motion from the post to the spindle, and to permit endwise movement of the spindle relatively to the post.

It is now clear that the post —5— with the pinion —1— thereon is free to rock in the bearing —7— or rather is free to oscillate to compensate for any irregularities in the contour of its teeth when meshing with the master burnishing gears —2—, the axial movement of the pinion relatively to its supporting post —5— serving also to compensate for certain inaccuracies in the contours of the teeth of the pinion meshing with the master gears —2—.

In view of this freedom of angular movement of the pinion about the center of the ball-bearing —7—, and also its freedom to move axially relative to the post —5— enables the pinion to float in different directions, as may be necessary to produce the desired rectification of any inaccuracies in the contours of the teeth of the gear under treatment, or being operated upon by the burnishing gears —2—.

Suitable means is provided for adjusting the burnishing gears radially to produce the desired pressure of its teeth upon the teeth of the gear —1— in process of treatment, and for this purpose the burnishing gears —2— are mounted upon separate circular hubs —12— which in turn are secured to separate shafts —13—, but eccentric thereto with the axes thereof intersecting each other at the apex of the pitch angle of the pinion —1—.

The axes of the shafts —13— also intersect each other at the same point or apex so that any angular adjustment of the shafts —13— about their respective axes will cause a corresponding angular adjustment of their respective eccentrics 12 and burnishing gears —2— mounted thereon to vary the pressure of the teeth of the gears —2— against the teeth of the pinion —1— as the gears —2— and gear —1— are relatively rolled in mesh with each other.

In order that the burnishing or lapping action of the gears —2— upon the gear —1— may be uniform, the shafts —13— are journaled in suitable bearings —14— on a rotary carrier —15— which is journaled on a cylinder bearing 8' on the lower end of the post —8— of the main supporting frame A coaxial with the axis of the supporting post —5— of the pinion —1— when the latter is running normal to its axis. Any suitable means may be provided for rotating the carrier —15—, and for this purpose a circular rack or worm-wheel —16— is secured to the periphery of the carrier, and engaged by a worm —17— which is secured to a rotary shaft —18— carrying a pulley —19— adapted to be belted or otherwise connected to a source of power (not shown).

The rotation of the carrier —15— will, of course, carry the shafts —13— and gears —2— separated thereby, about the axis of the pinion —1— to establish rolling contact between the teeth of the gears —2— and pinion —1— until any imperfections in the teeth of the pinion are rectified. The lower sides of the gears —2— are adapted to travel in a suitable pan or receptacle —20— containing an abrasive substance preferably in the form of a liquid adapted to be picked up by the gears —2— and carried upwardly into contact with the teeth of the pinion —1— as the gears and pinion are rolled in mesh with each other by the rotation of the carrier —15—.

Any suitable means may be provided for turning the shafts 13 to cause the eccentrics —12— to press their respective gears —2— into close engagement with the teeth of the pinion —1—, and for this purpose each shaft —13— is provided at its outer end with a pinion —21— meshing with toothed rack or ring —22— which is journaled upon the periphery of a reduced portion of the carrier —15—, as shown in Figure 1, to rotate therewith, said ring being provided with a hand rim —23— by which it may be rotated when desired.

It is evident, however, that when the carrier —15— is rotated by the driving shaft —18— the ring —22— and shafts —23— will be rotated together about the axis of the spindle —5— for the purpose of rolling the burnishing gears —2— against the teeth of the pinion —1—.

The ball —6— is provided with radially projecting pins or keys —6'— loosely engaged in corresponding slots —7'— in opposite sides of the bearing —7— to hold the post —5— against rotation while permitting a limited oscillation thereof, and of the spindle —9— substantially as and for the purpose previously explained, it being understood that the spindle —3— is also held against relative rotation in the socketed post —5— by the engagement of the pins —11— in the slots —11'—.

The purpose of the three burnishing gears arranged in uniformly spaced relation about a common axis is to establish an automatic centering means for the gear or pinion under treatment on the three-point bearing principle, and thereby to maintain a more perfect running mesh between the meshing teeth of the rolling gears.

In Figure 3 I have shown diagrammatically three burnishing gears of the hypoid type in which the axes of rotation are tangential to a circle about the axis of the gear under treatment instead of intersecting each other at the apex of the pitch angle of the gear in process, as shown in Figures 1 and 2, but the same principle of a three point bearing for the gear under treatment is maintained in the use of hypoids, spiral bevel, skew bevel, skew toothed or straight toothed bevel gears.

It is found that the best results have been obtained by the use of hardened burnishing or master gears of rather heavy construction in which the teeth are ground to the theoretically correct contour while the gear under treatment is preferably unhardened, or what is commonly known as soft, so that it is more susceptible to correction of imperfections in the contour of its teeth by rolling mesh with the hardened master gears.

Altho I have shown a specific device for rolling the master gears around and against the gear in process, it is evident that any other means for establishing this rolling motion of the master gears in mesh with the gear under treatment may be used without departing from the spirit of this invention.

For example, any one or all of the burnishing gears may be rotated to effect the desired rolling mesh of its or their teeth with the gear under treatment, or the gear to be burnished may serve as the driving element for effecting the same rolling engagement of the teeth.

It is also evident from the foregoing description that if desired the gear under treatment may be held in a fixed position against oscillation or axial movement, or may be allowed to rotate with the rotation of the intermeshing burnishing gears.

The abrasive material employed may be a thin mixture of white-lead to serve both as a lubricant and an abrasive, or any other suitable mixture which may be carried by the teeth of the burnishing gears to the gear under process for effecting the desired burnishing and finishing of the teeth of the gear to be burnished.

I claim:

1. The herein described method of burnishing bevel gears comprising meshing three bevel gears with a fourth bevel gear and imparting a rotary motion to at least one of the gears to establish relative rolling engagement of the three gears with the fourth gear.

2. A method of burnishing bevel gears which comprises rotatably supporting a plurality of bevel gears in uniformly spaced relation about a common axis with their axes intersecting in said axis, rotatably supporting an additional bevel gear coaxial with said axis and in mesh with the first-named gears, and causing a rolling motion of the additional gear while in mesh with the other gears.

3. In a machine for rectifying imperfections in the contours in the teeth of bevel gears, means for supporting at least three bevel gears in uniformly spaced relation about a common axis, means for rotatably supporting a fourth bevel gear in mesh with the three first-named gears, and means for effecting a relative rolling motion of the intermeshing gears.

4. A machine for rectifying imperfections in the teeth of bevel gears as in claim 3, in which the supporting means for the fourth gear has a limited radial movement in all directions to compensate for imperfections in the mesh of said gears during said rolling motion.

5. A machine for rectifying imperfections in the teeth of bevel gears as in claim 3 in which the supporting means for the fourth gear has a limited axial movement to compensate for imperfections in the mesh of said gears during said rolling motion.

6. A machine for rectifying imperfections in the teeth of bevel gears as in claim 3 in which means is provided for varying the pressure between the intermeshing teeth as the rolling motion continues.

7. In a machine for rectifying imperfections in the contours in the teeth of bevel gears, a rotary carrier, a bevel gear rotatably mounted on the carrier, means for supporting another bevel gear in mesh with the first-named gear, and means for rotating the carrier to cause the gear thereon to roll around the other gear in mesh therewith.

8. In a machine for rectifying imperfections in the contours in the teeth of bevel gears, a rotary carrier, a bevel gear rotatably mounted on the carrier, means for supporting another bevel gear in mesh with the first-named gear, means for rotating the carrier to cause the gear thereon to roll around the other gear in mesh therewith, and means for adjusting one of the gears to vary the pressure between the intermeshing teeth thereof.

9. In a machine for rectifying imperfections in the contours in the teeth of bevel gears, a gear-supporting member rotatable about an axis and provided with an eccentric journal bearing, a bevel gear journaled on said bearing, means for supporting the gear to be treated in mesh with the first-named gear, means for effecting a relative rolling motion of the intermeshing gears, and means for turning said member about its axis for varying the pressure between the intermeshing teeth of the gears.

10. In a machine for rectifying imperfections in the contours in the teeth of bevel gears, a rotary carrier, three bevel gears rotatably mounted on the carrier in uniformly spaced relation about the axis thereof, and means for supporting another bevel gear in mesh with the first-named gears whereby the rotation of the carrier will cause rolling engagement of the three bevel gears with the other gear.

11. In a machine for rectifying imperfections in the contours in the teeth of bevel gears, a rotary carrier, three bevel gears rotatably mounted on the carrier in uniformly spaced relation about the axis thereof, means for supporting another bevel gear in mesh with the first-named gears whereby the rotation of the carrier will cause rolling engagement of the three bevel gears with the other gear, and means for adjusting the three gears about separate axes at an angle to their axes of rotation for varying the pressure between the intermeshing teeth.

In witness whereof I have hereunto set my hand this 12 day of August 1927.

CHARLES H. LOGUE.